(12) United States Patent
Relyea

(10) Patent No.: US 8,719,574 B2
(45) Date of Patent: May 6, 2014

(54) CERTIFICATE GENERATION USING VIRTUAL ATTRIBUTES

(75) Inventor: Robert Relyea, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1250 days.

(21) Appl. No.: 11/469,459

(22) Filed: Aug. 31, 2006

(65) Prior Publication Data

US 2008/0072039 A1    Mar. 20, 2008

(51) Int. Cl.
*H04L 9/32* (2006.01)
*G06F 17/30* (2006.01)
*H04K 1/00* (2006.01)

(52) U.S. Cl.
USPC ............... 713/175; 713/158; 726/10; 380/30; 380/279; 380/286

(58) Field of Classification Search
USPC ........... 713/158, 175; 709/220, 228; 380/282, 380/30, 279, 286; 726/10
See application file for complete search history.

(56) References Cited

U.S. PATENT DOCUMENTS

| | | | |
|---|---|---|---|
| 4,868,877 A | | 9/1989 | Fischer |
| 5,996,076 A | | 11/1999 | Rowney et al. |
| 6,061,448 A | * | 5/2000 | Smith et al. ............... 380/282 |
| 6,105,131 A | * | 8/2000 | Carroll ........................ 713/155 |
| 6,134,658 A | * | 10/2000 | Multerer et al. ........... 713/175 |
| 7,003,661 B2 | | 2/2006 | Beattie et al. |
| 7,246,378 B1 | * | 7/2007 | Marvit et al. ............... 726/29 |
| 2002/0166049 A1 | | 11/2002 | Sinn |
| 2002/0184444 A1 | * | 12/2002 | Shandony ..................... 711/118 |
| 2003/0061144 A1 | | 3/2003 | Brickell et al. |
| 2003/0088678 A1 | * | 5/2003 | Boreham et al. ............... 709/228 |
| 2004/0098589 A1 | * | 5/2004 | Appenzeller et al. ......... 713/170 |
| 2004/0117626 A1 | | 6/2004 | Andreasyan |
| 2004/0158709 A1 | | 8/2004 | Narin et al. |
| 2004/0199614 A1 | * | 10/2004 | Shenfield et al. ............. 709/220 |
| 2005/0114652 A1 | * | 5/2005 | Swedor et al. ............... 713/156 |
| 2005/0120212 A1 | * | 6/2005 | Kanungo et al. ............. 713/170 |
| 2005/0268090 A1 | | 12/2005 | Saw et al. |
| 2006/0206707 A1 | | 9/2006 | Kostal et al. |
| 2007/0055867 A1 | | 3/2007 | Kanungo et al. |
| 2007/0130617 A1 | | 6/2007 | Durfee et al. |
| 2010/0138908 A1 | | 6/2010 | Vennelakanti et al. |

OTHER PUBLICATIONS

International Telecommunication Union, "X.500 : Information technology—Open Systems Interconnection—The Directory: Overview of concepts, models and services" Feb. 2001.*
Miller et al. "Kerberos Authentication and Authorization System" Project Athena Technical Plan, Section E.2.1, Oct. 1988.*
Wiesner, Christian. "Query Evaluation Techniques for Data Integration Systems", Mar. 2004.*

(Continued)

*Primary Examiner* — Michael Simitoski
(74) *Attorney, Agent, or Firm* — Lowenstein Sandler LLP

(57) ABSTRACT

A server, method and/or computer-readable medium system for secure communication includes a certificate authority for generating certificates signed by the certificate authority and associated public and private keys for a client. The server further includes a directory of client attributes and client virtual attributes. At least one of the client virtual attributes is for, when receiving a query for a client that cannot be located in the directory, requesting the certificate authority to dynamically generate a certificate and associated public and private key for the client, and for storing the dynamically generated certificate and public key as a client attribute in the directory.

22 Claims, 10 Drawing Sheets

(56) References Cited

OTHER PUBLICATIONS

Kanungo, Rajesh et al. U.S. Appl. No. 60/420,313, available Jun. 2, 2005.*

Office Action for U.S. Appl. No. 11/879,392, mailed Aug. 4, 2010.
Office Action for U.S. Appl. No. 11/879,392, mailed Dec. 22, 2010.
Office Action for U.S. Appl. No. 11/879,392, mailed May 25, 2011.
Final Office Action for U.S. Appl. No. 11/879,392, mailed Oct. 25, 2011.

* cited by examiner

CERTIFICATE GENERATION USING VIRTUAL ATTRIBUTES

DESCRIPTION OF THE INVENTION

1. Field of the Invention

The present invention relates generally to a public key infrastructure (PKI) and, more particularly, to a method and system for providing dynamic certificate generation in such a PKI.

2. Background of the Invention

As computer systems and associated networks become more ubiquitous and complex, as the sensitivity of the content of the systems and network increases, and as the conventional client access paradigms changes for organizations of all types and sizes, from main offices or workplaces having dedicated IT systems to decentralized networks of IT servers and the like, system security rapidly becomes a major concern. Where secure access is required for individuals in a multi-client environment, security and identity verification and management become more important in maintaining system and network security and data integrity.

In view of these concerns, conventional computer systems and associated networks can operate in accordance with a public key infrastructure (PKI) in which a certificate authority (CA) serves as a trusted source for issuing digital certificates for clients, thereby permitting a trusted environment for secure communication. The digital certificates will be referred to as certificates. An individual certificate can include information about the client such as a public key used to encrypt data for the particular client. The certificates for the clients of the PKI may be stored in a directory associated with the CA. The directory may be accessibly by a client, CA or other entity for directory querying and directory modification.

In an application using the PKI, a client such as a message sender first must obtain the certificate and associated public key for an intended recipient from the directory before sending a message to the recipient. After obtaining the certificate, the client can encrypt a message based upon the public key associated with the certificate for the message recipient. To obtain the certificate, the client queries the directory for the certificate for the recipient, and the directory returns the certificate for the recipient.

If the recipient does not have a certificate for the PKI, encrypted messages cannot be sent to the recipient until the recipient obtains such a certificate. However, the process for acquiring a certificate conventionally is a manual process. Therefore, applications such as email applications utilizing the PKI will be significantly hindered until a significant portion of the publishing acquires certificates.

Therefore it would be desirable for a solution to enable faster generation of certificates of clients within a PKI. In addition, factors such as scalability, standards compliance, regulatory compliance, security administration and the like must also be taken into consideration.

While a general background including problems in the art are described hereinabove, with occasional reference to related art or general concepts associated with the present invention, the above description is not intended to be limiting since the primary features of the present invention will be set forth in the description which follows. Some aspects of the present invention not specifically described herein may become obvious after a review of the attendant description, or may be learned by practice of the invention. Accordingly, it is to be understood that both the foregoing general description and the following detailed description are exemplary and explanatory only in nature and are not restrictive of the scope or applicability of the present invention.

BRIEF DESCRIPTION OF THE DRAWINGS

The accompanying drawings, which are incorporated in and constitute a part of this specification, illustrate various exemplary embodiments of the invention and together with the description, serve to explain the principles of the invention. In the figures.

DETAILED DESCRIPTION

Figure 1:
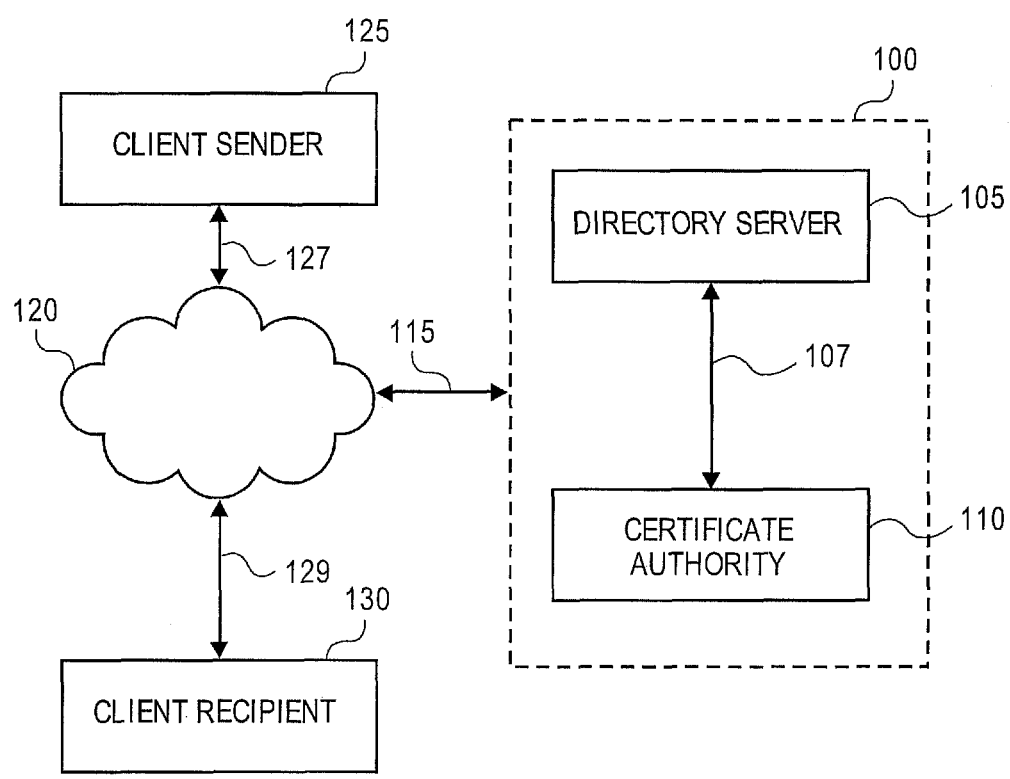
FIG. 1 is a diagram illustrating a simplified and representative environment in which a client sender sends data to a client recipient via a public key infrastructure provided by a server for secure transmission.

In overview, the present disclosure concerns secure computer systems for providing a public key infrastructure (PKI) that may be operated in connection with certifying and/or authenticating identifiers associated with clients and/or computers and/or tokens. Such secure systems may be used in connection with other services such as communications, secure access, and/or telecommunications. Such secure systems can include computer systems, servers or the like which support client access to independent data objects representing certificates, keys, identifiers, and related data, by, for example, providing end-client interfaces, managing keys, and providing authentication. More particularly, various inventive concepts and principles are embodied in systems, devices, and methods therein for providing dynamic certificate generation in a PKI.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

As further discussed herein below, various inventive principles and combinations thereof are advantageously employed to provide dynamic certificate generation in a system for secure communication according to a PKI. The system can be implemented by, for example, a server having a certificate authority (CA) for generating digital certificates for clients signed by the CA and a server including a directory of client attributes and client virtual attributes. An individual digital certificate generated by the CA can include an associated public key for a particular client. The client virtual attributes can be for requesting the CA to dynamically generate the digital certificate associated with the client if an entry associated with the client cannot be located in the directory in response to the directory query and for storing the dynamically generated digital certificate and public key as a client attribute in the directory.

The phrase "data objects" as used herein refers to information representing certificates, private and public keys, and related data. As discussed more fully below, these data objects may be stored at a server or computing device serving as a certificate authority, directory or client. Reference will now be made in detail to the accompanying drawings. Wherever possible, the same reference numbers will be used throughout the drawings to refer to the same or like parts.

Referring now to FIG. 1, a simplified and representative exemplary environment in which a server 100 for implementing a system for secure communication, such as a PKI, is accessed by clients will be discussed and described. The PKI enables enterprises to deploy authentication form signing, virtual private networks (VPN), routers, and Secure/Multi-purpose Internet Mail Extensions (S/MIME), or the like. The server 100 includes a directory server 105 connected to a certificate authority 10 via a connection 107. The server 100 can have a connection 115 with, for example, a network 120 for providing client access. The connection 115 can be a direct connection such as a wired or wireless connection or can be an indirect connection. The network 120 may be, for example, the Internet, a local area network, wide area network, private network, and a communication network. A client 125, which will be referred to as a client sender, that intends to send data to another client 130, which will be referred to as a client recipient via the PKI can access the server 100 via the network 120. The client recipient 130 may also access the server 100 via the network 120. Accordingly, the client sender 125 and the client recipient can have connections 127, 129 with the network 120 that may be direct connections such as a wired or wireless connection or can be indirect connections. Generally, the connection 115 and the network 120 provide a communication channel for the server 100 to exchange data with clients 125, 130. The clients 125, 130 can be APIs of remotely located computing devices such as APIs for providing email services.

The CA 110 serves as a trusted source in the PKI for generating digitally signed certificates (hereafter "certificates") such as an X.509v3 certificate for clients, thereby permitting a trusted environment for secure communication. The certificate may be issued by just the CA 110, or the certificate may be issued by a plurality of hierarchically organized CAs, or even by CAs cross-organized with other PKIs. The CA 110 may be implemented by a server or computing device. The certificate will bind a distinguished name of a client to a public key.

The directory server 105 is for providing a directory of client attributes and virtual attributes. The directory server 105 may be implemented by a server or computing device. The directory can have a data model similar to the X.500 directory model composed of a tree of entries, each including a set of named client attributes with values. Thereby, the directory can be rapidly searched to obtain particular data upon receiving a directory query. The directory may be accessed by a client, the CA 110 or other entity via a networking protocol such as a Lightweight Directory Access Protocol (LDAP) for querying and modifying. However, it should be appreciated that the directory could be accessed by other networking protocols such as X.500 Directory Access Protocol, XML Enabled Directory (XED), Directory Services Markup Language (DSML), Service Provisioning Markup Language (SPML), and the Service Location Protocol (SLP). However, generally the directory provided by the directory server 105 should be LDAP-compliant.

As mentioned above, the directory includes client attributes and virtual attributes. The client attributes may be data such as a distinguished name for a client, a common name for a client, an email address for a client, an address for a client, a public key for encryption for the client and generally data from the certificates generated by the CA 110 and published into the directory.

The virtual attributes include executable script for sending a request to the CA 110 when the directory receives a directory query for a data object for the client that cannot be located in the directory. The data object may be an entry or client attribute such as a certificate and associated public key for the client. The request is for the CA 110 to dynamically generate a certificate and associated public and private key for the client, and for storing the dynamically generated certificate and public key as a client attribute in the directory. That is, the virtual attribute automatically fetches the dynamically generated certificate and public key upon receiving a directory query for a client attribute when a query for the client attribute fails to locate a corresponding directory entry for the client. Virtual attributes are disclosed in application Ser. No. 11/515,236, entitled "INVOKING ACTIONS ON DATA VIA LDAP REQUESTS," Kinder et al., filed Aug. 31, 2006, the contents of which are incorporated herein by reference.

Figure 2A:
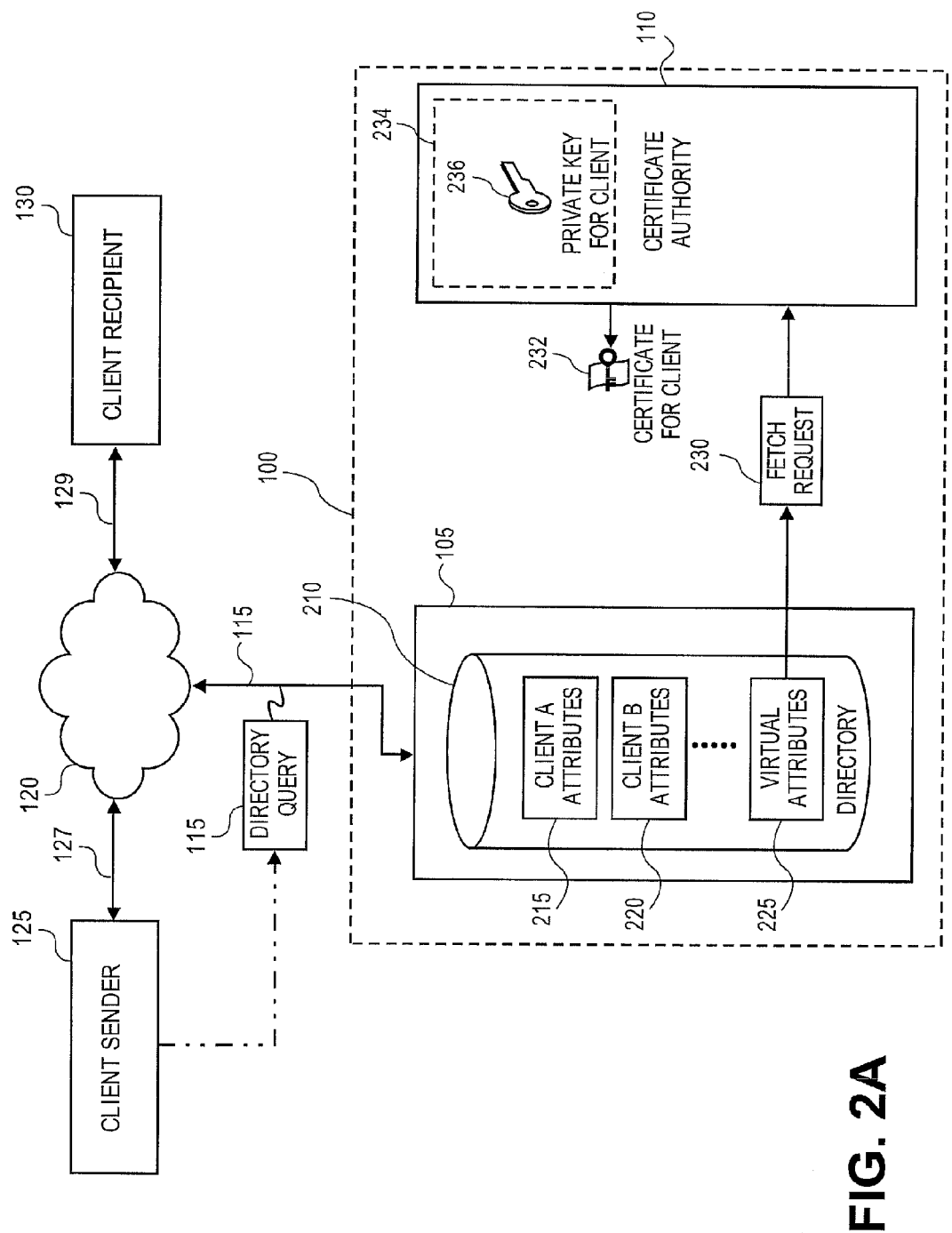
FIGS. 2A-2C are diagrams illustrating exemplary operations of a server when a client sender sends an encrypted message to a client recipient via the PKI according to an embodiment.
Figure 2B:
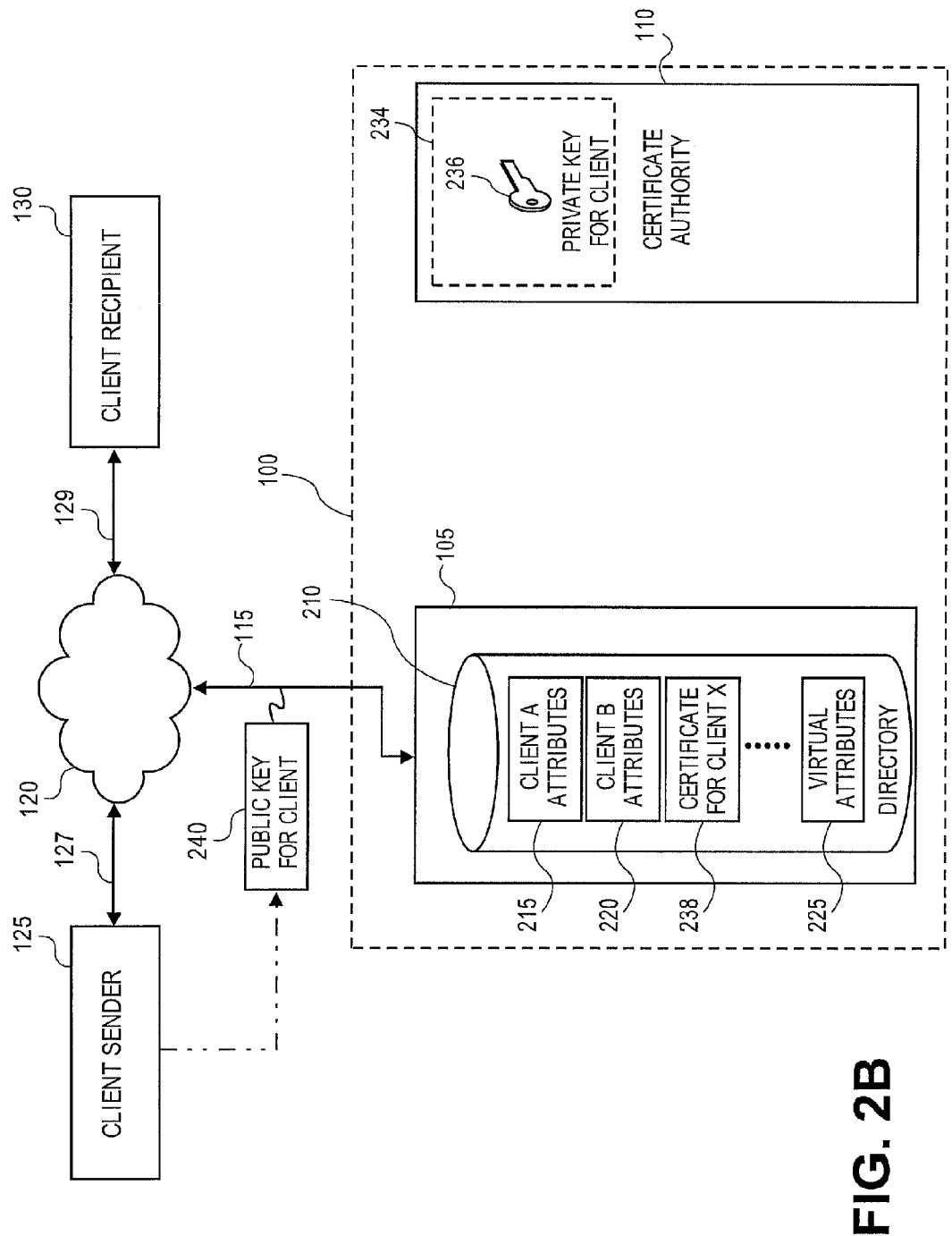
Figure 2C:
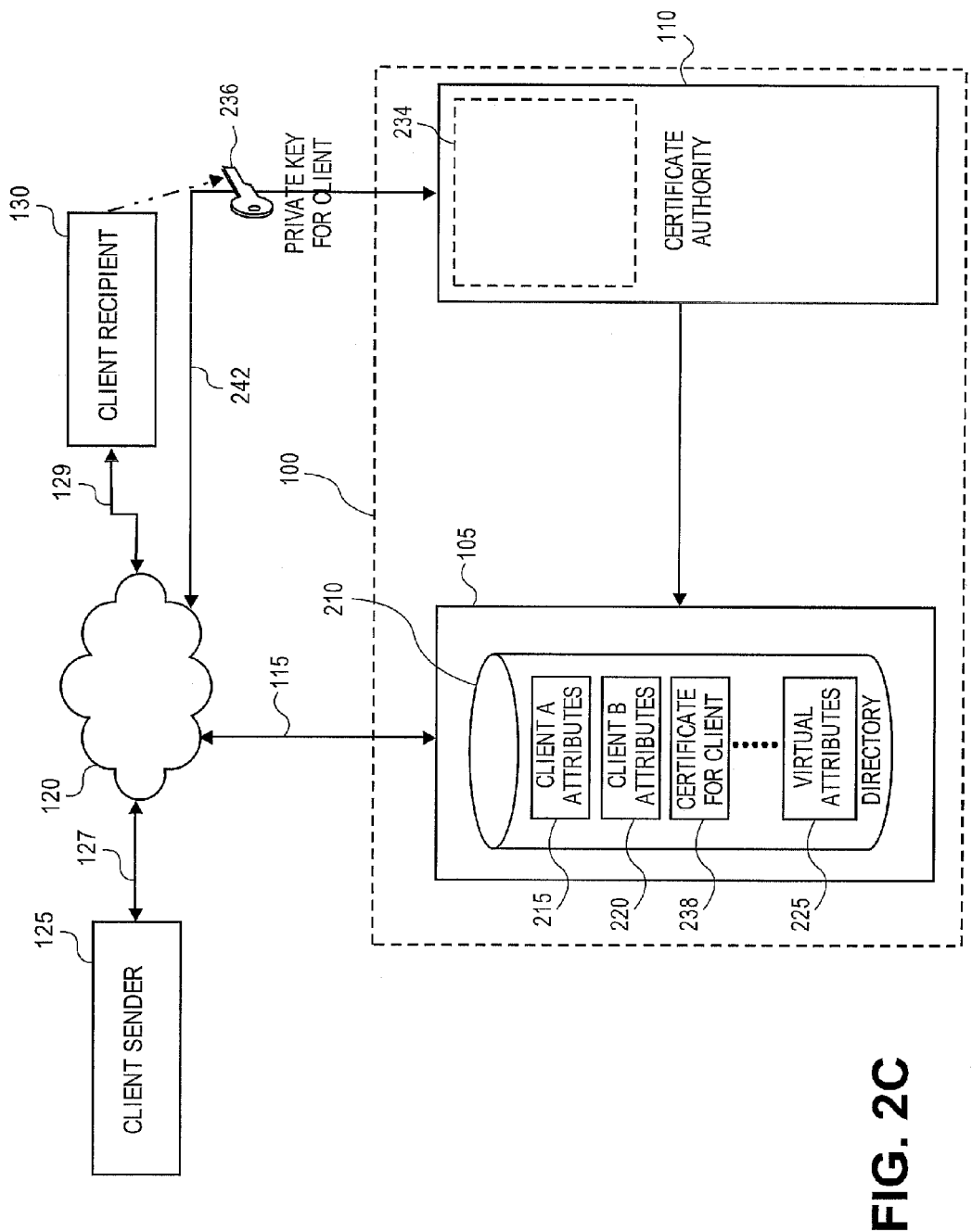

Referring to FIGS. 2A-2C, operations of the server 100 will be discussed according to an example in which the client sender 125 attempts to send encrypted data as a message to the client recipient 130 via the PKI provided by the server 100. That is, the client sender 125 desires to send encrypted data to a client recipient 130 via the PKI established by the server 100. First, the client sender 125 must obtain the certificate for the client recipient 130 in order to encrypt the data with the public key associated with the certificate for the client recipient 130. Accordingly, as shown in FIG. 2A, the client sender 125 sends a directory query 205 to the directory 210 of the directory server 105 to request the certificate for the client recipient 130. The directory query 205 can be, for example, an LDAP directory query. As shown, the directory 210 includes client attributes 215, 220 and virtual attributes 225. However, no certificate and associated public key as a client attribute for the client recipient 130 is present in the directory 210. That is, the directory query 205 is for a client for which no entry associated with the client can be located in the directory in response to the directory query. As a result, the virtual attributes 225 request the CA 110 to dynamically generate a certificate and associated public and private key for the client recipient 130. Particularly, an executable script included in the virtual attributes 225 causes the directory server 105 to automatically generate a fetch request 230 and to send the fetch request 230 to the CA 110. The fetch request 230 is the request to dynamically generate the certificate and associated public key and private key for the client recipient 130.

In response to the fetch request 230, the CA 110 generates the certificate 232 with the associated public key embedded therein and also generates the associated private key 236. Alternatively, the CA 110 can generate the public key as a separate certificate. The CA 110 stores the dynamically generated private key 236 in a secure memory 234 to be accessed by the client recipient 130 after a client authentication process. The certificate 232 with the associated public key embedded therein is returned to the directory server 105.

As shown in FIG. 2B, the dynamically generated certificate 232 is published in the directory 210 as a client attribute 238. That is, the certificate and associated public key will be saved as a client attribute 238 for the recipient client in the directory 210. The publishing of the dynamically generated certificate 232 may be performed by the directory server 105 or the CA 110. For example, the CA 110 or the directory server 105 can include a publisher to specify the attribute in the directory 210 that will store the certificate 232 and a mapper to determine the distinguished name of the entry of the directory 210. The public key 240 can then be returned to the client sender 125 in response to the directory query 205.

Referring to FIG. 2C, the client recipient 130, after receiving the message from the client sender 125 that was encrypted by the public key 240, must obtain the private key 236 stored in the secure memory 234 to decrypt the data included in the message. Therefore, a secure connection 242 is established between the client recipient 130 and the CA 110. The connection can be directly from the CA 110 to the client recipient 130 via the network 120, or the connection can be also via the directory server 105. However, the connection should be secure. The secure connection can be provided by, for example, Secure Sockets Layer (SSL) 2.0, 3.0. The CA 110 then performs a client authentication process with the client recipient 130. The client authentication process can be, for example, a Kerberos authentication process. Assuming that the client authentication process is successful, the CA 110 then transfers the private key 236 to the client recipient 130 via the secure connection 242. The client recipient 130 can then decrypt the encrypted data in the message received from the client sender 125.

Figure 3A:
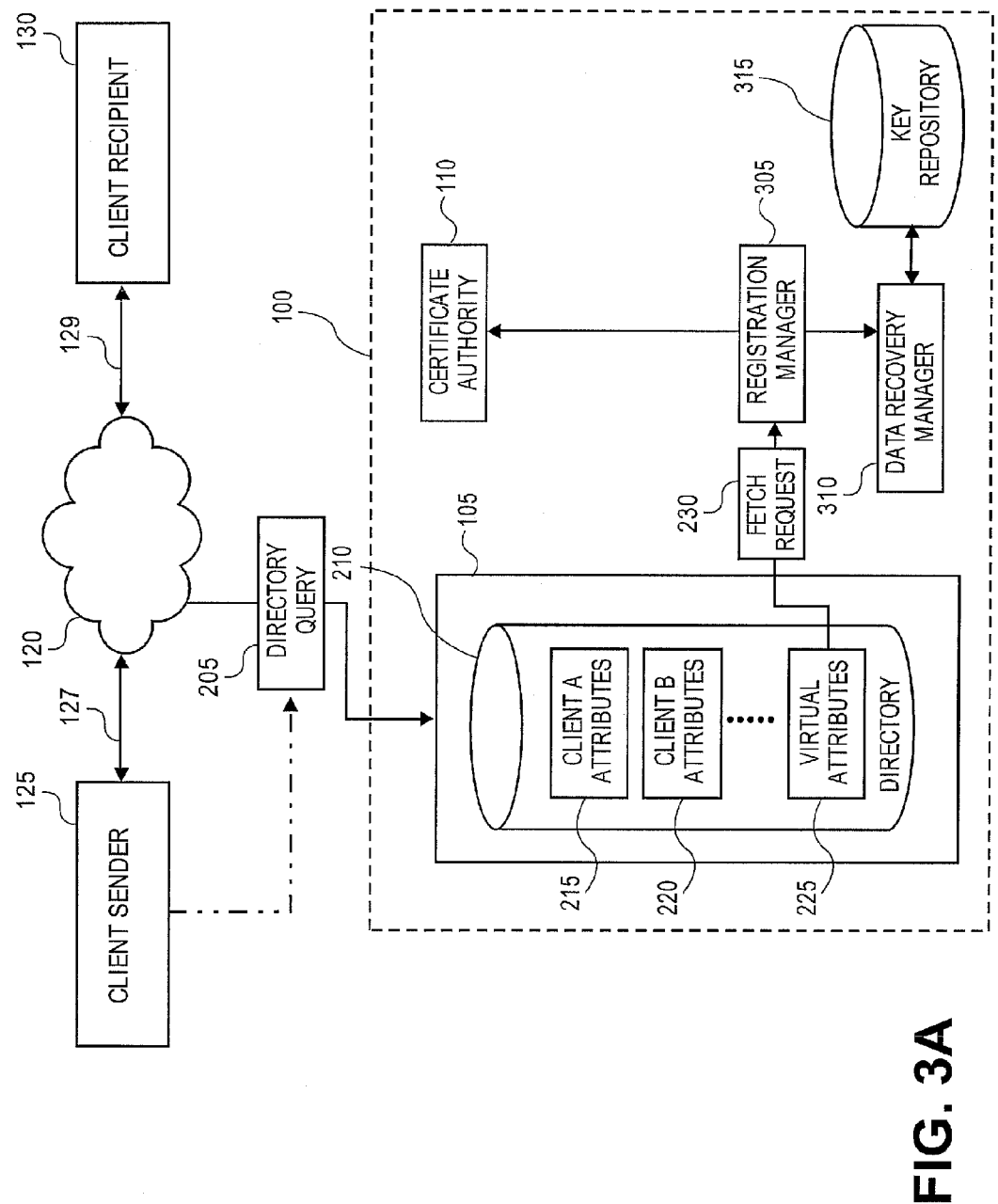
FIGS. 3A-3C are diagrams illustrating exemplary operations of a server when the client sender sends the encrypted message to the client recipient via the PKI according to another embodiment.
Figure 3B:
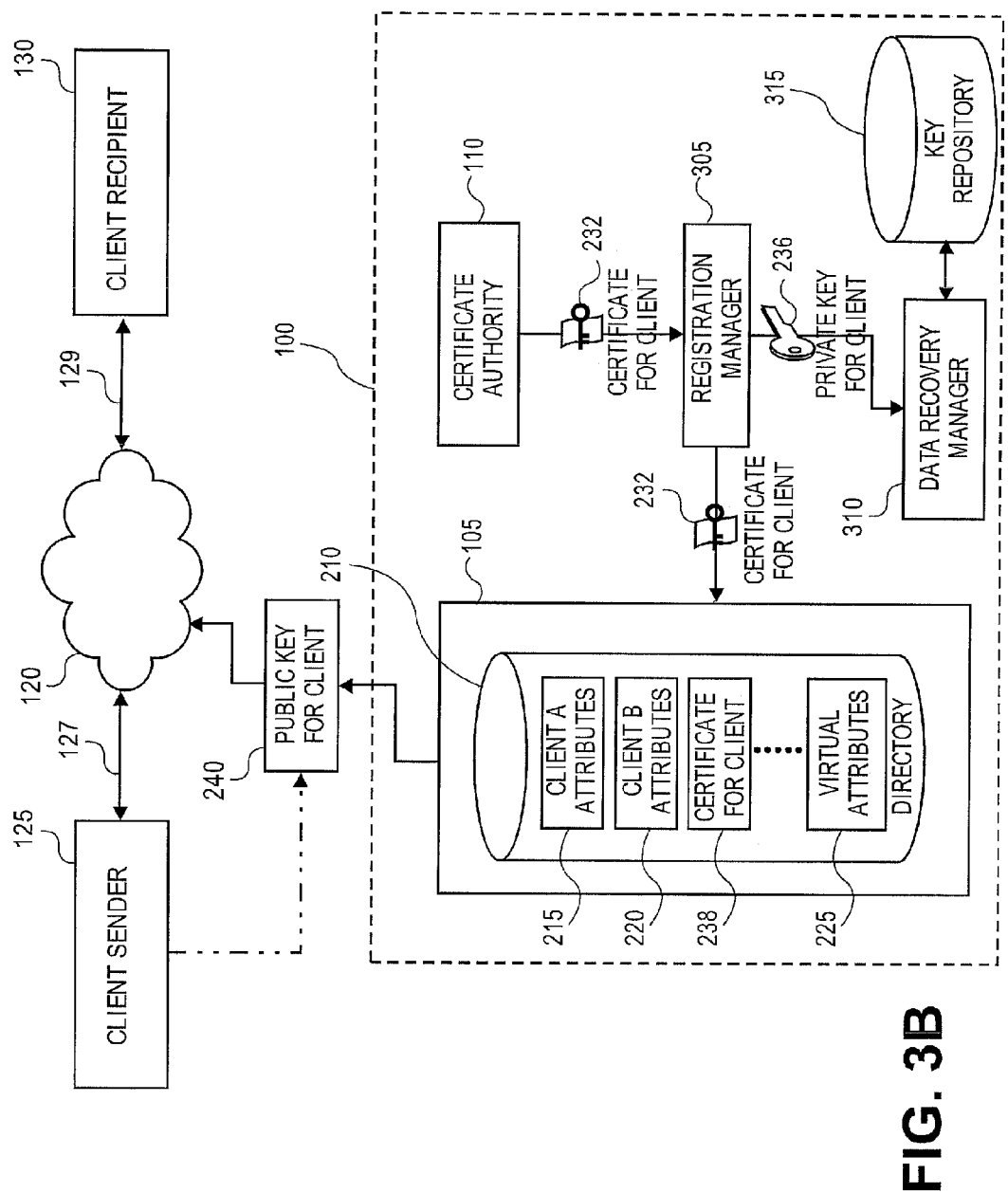
Figure 3C:
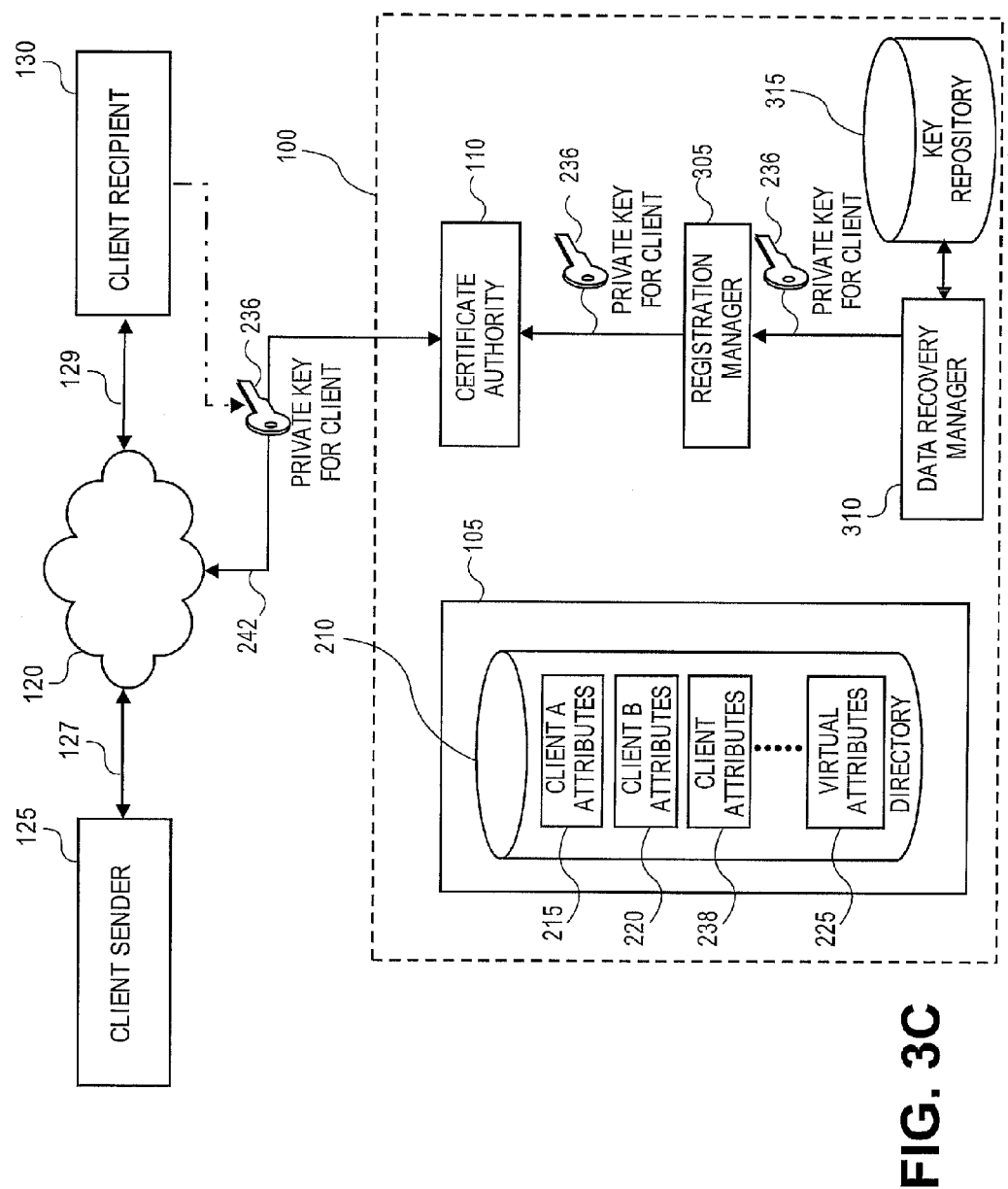

Referring to FIGS. 3A-3C, operations of another embodiment of the server 100 will be discussed according to the previous example in which a client sender 125 sends encrypted data as a message to a client recipient 130 via the PKI provided by the server 100. The server 100 can include a registration manager 305 and a data recovery manager 310, both of which may be implemented as subsystems of the CA 110. The registration manager 305 provides registration authority functionality for the CA 110. The data recovery manager 310 is for storing the dynamically generated private key 236 in a secure memory 315 that will be referred to as a key repository.

Referring to FIG. 3A, the client sender 125 sends a directory query 205 to the directory 210 in order to obtain the public key associated with the certificate for the client recipient 130. Similarly to as shown in FIG. 2A, because no certificate as a client attribute or an entry associated with the client recipient 130 can be returned as a query result, the directory server 105 sends a fetch request 230 to the CA 110 requesting the CA 110 to dynamically generate a certificate for the client recipient 130. Particularly, the fetch request 230 is sent the registration manager 305. The registration manager 305 then forwards the fetch request 230 to the CA 110.

Referring to FIG. 3B, in response to the fetch request 230, the CA 110 generates the certificate 232 and associated public and private keys for the client recipient 130. As discussed above, the public key can be embedded in the certificate 232. The registration manager 305 forwards the private key 236 to the data recovery manager 310 and forwards the certificate 232 and associated public key to the directory server 105. The data recovery manager 310 stores the private key in the key repository 315. The directory server 105 publishes the certificate 232 and public key in the directory 210 as a client attribute for the client recipient 130. Alternatively, the registration manager 305 can publish the dynamically generated certificate and public key in the directory 210. The directory server 105 forwards the public key 240 for the client recipient 130 as a reply to the directory query, that is, as a query result.

Referring to FIG. 3C, the client recipient 130, after receiving the message from the client sender 125 that was encrypted by the public key 240, must obtain the private key 236 stored in the key repository 315 to decrypt the data included in the message. Therefore, a secure connection 242 is established between the client recipient 130 and the CA 110. The connection can be directly from the CA 110 to the client recipient 130 via the network 120, or the connection can be also via the directory server 105. However, the connection 242 should be secure. The CA 110 then performs a client authentication process with the client recipient 130. The client authentication process can be, for example, a Kerberos authentication process. Assuming that the client authentication process is successful, the data recovery manager 310 obtains the private key 236 from the key repository 315 and forwards it to the registration manager 305. The registration manager 305 forwards the private key 236 to the CA 110. The CA 110 then transfers the private key 236 to the client recipient 130 via the secure connection 242. The client recipient 130 can then decrypt the encrypted data in the message received from the client sender 125.

Figure 4:
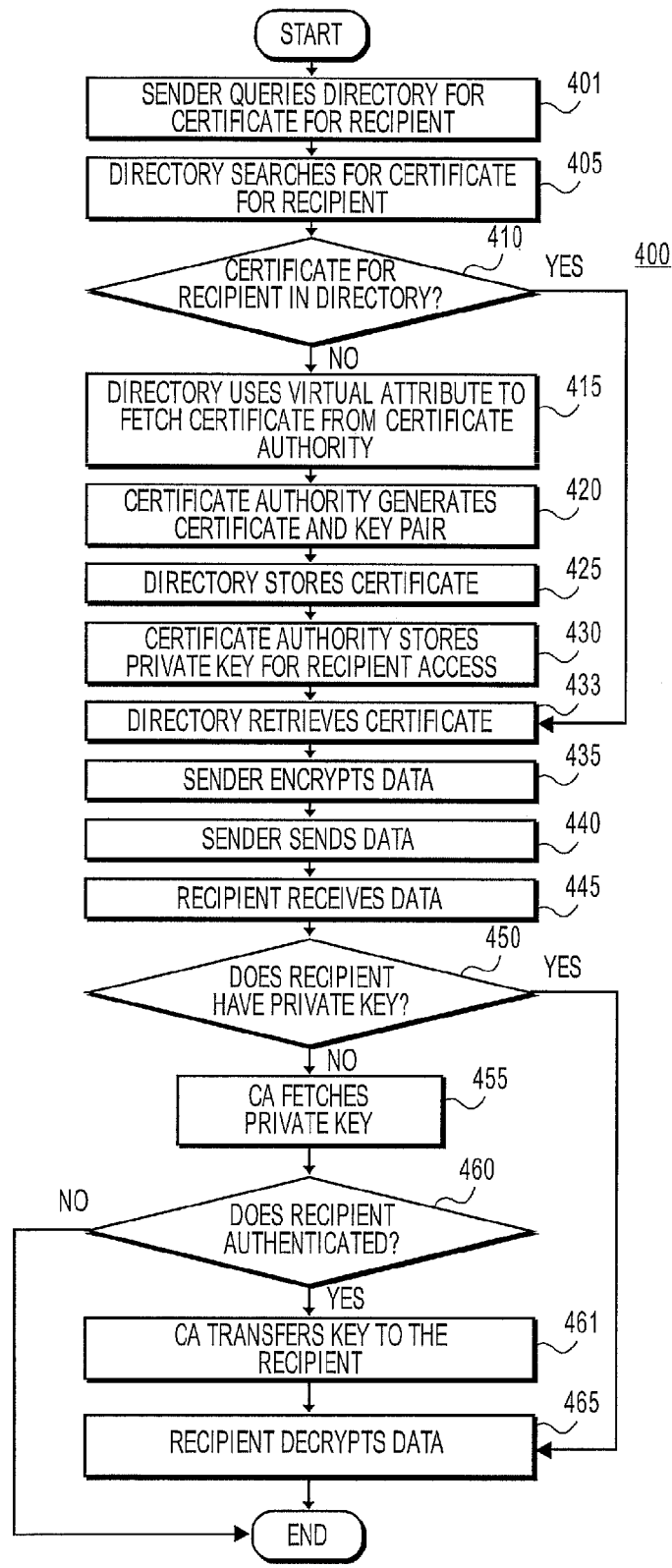
FIG. 4 is a flow chart illustrating an exemplary operation of a server for secure transmission.

Referring to FIG. 4, a flow chart illustrating a methodology 400 of operation of the server 100 for providing the PKI will be discussed. At 401, a client sender 125 queries the directory 210 for a certificate for the client recipient 130. That is, the client sender 125 sends the directory query to the directory 210. At 405, the directory server 105 searches the directory 210 for the certificate of the client recipient 130. At 410, a determination is made as to if an entry such as a certificate for the client recipient 130 is in the directory 210. For example, the directory 210 may be searched for an entry associated with the client recipient 130 such as a client attribute for the client recipient 130 to obtain the public key of the client recipient 130.

If, at 410, no certificate for the client recipient 130 can be located in the directory, then, at 415, the directory 105 uses the virtual attribute to fetch a certificate from the CA 110. That is, at 415 the directory 105 sends a fetch request to the CA 110. At 420, the CA 110 dynamically generates the certificate and associated public and private keys for the client recipient 130. At 425, the directory server 105 stores the dynamically generated certificate and associated public key in the directory 210 as user attributes. As discussed above, the dynamically generated certificate and associated public key can alternatively be stored in the directory 210 by the CA 110. At 430, the CA 110 stores the dynamically generated private key in a secure memory to be accessed by the recipient client 130 after performing an authentication process. At 433, the directory 210 retrieves the certificate for the client recipient 130 and sends it to the client sender 125 as a query result.

If, at 410, an entry or a client attribute such as a certificate for the client recipient 130 is determined to be in the directory, that is, YES at 410, then, at 433 the directory 210 retrieves the certificate for the client recipient 130 and sends it to the client sender 125 as a query result without generating the fetch request.

At 435, the client sender 125 uses the public key associated with the certificate to encrypt the data to be sent to the client recipient 130 as a message. At 440, the client sender 125 sends the encrypted data to the client recipient 130, who receives the encrypted data at 445.

If, at 450, the client recipient 130 already has the private key, that is, YES at 450, then at 465 the client recipient 130 decrypts the encrypted data. If, at 450, the client recipient 130 does not have the private key, that is, NO at 450, then at 455 the CA 110 fetches the private key from the secure memory 234. Here, a secure channel is established between the CA 110 and the client recipient 130 and a client authentication process is performed.

If, at 460, the client recipient 130 is successfully authenticated by the client authentication process, that is, YES at 460, then at 461 the CA 110 transfers the private key to the client recipient 130. At 465, the client recipient 130 decrypts the encrypted data. If, at 460 the client recipient 130 is not successfully authenticated, then the process ends without transferring the private key to the client recipient 130.

It should be noted that the methodology 400 is not limited to obtaining a public key for a client recipient to encrypt data in a message to be sent by a client sender 125. For example, the methodology 400 may also be used for obtaining the requisite key for generating a digital signature and verifying a digital signature.

Figure 5:
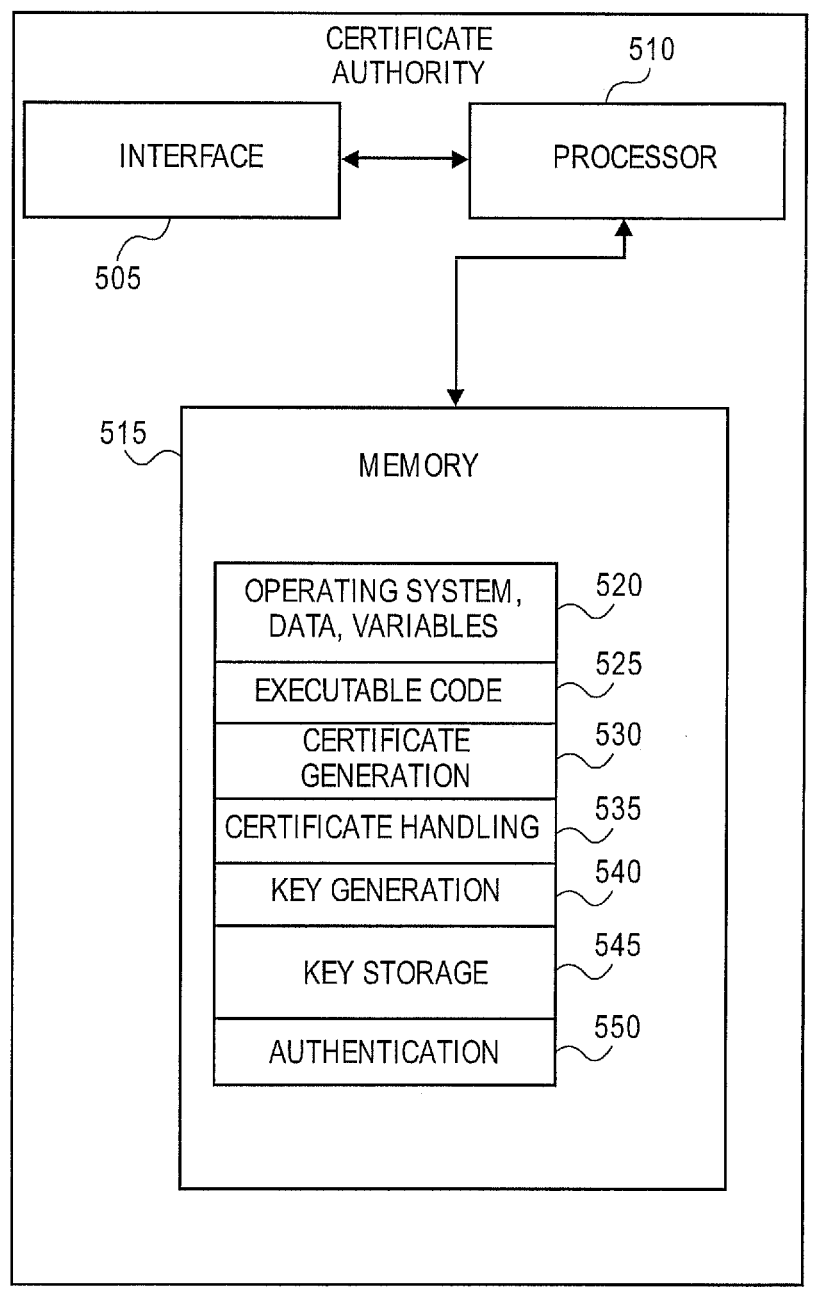
FIG. 5 is a block diagram illustrating portions of an exemplary certificate authority.

Referring to FIG. 5, exemplary portions of the CA 110 will be discussed. The CA 110 includes an interface 505, a processor 510 and a memory 515 as well as optional known peripherals for interfacing with a client, such as a display and input devices that are not illustrated. The interface 505 is generally for providing an interaction between the connection 107 with the directory server 105 and the CA 110, such as, for example, the processor 510. The interface 505 may also be used in connection with another computer by known universal serial bus (USB) technology. The processor 510 can be one of a variety of different processors including general purpose processors, custom processors, controllers, compact eight-bit processors or the like. The processor 510 may comprise one or more microprocessors and/or one or more digital signal processors. The memory 515 can be coupled to the processor 510 and may comprise a random access memory (RAM), read only memory (ROM), flash memory, dynamic RAM (DRAM) or the like. The memory 515 may include multiple memory locations and store an operating system, data and variables 520 and executable code 525. Further, the memory 515 can include instructions such as computer programs for directing the processor 510 to control the operation of the CA 110. The computer programs can include, for example, certificate generation 530, certificate handling 535, key generation 540, key storage 545 and authentication 550. These are described in more detail below.É

The certificate generation instructions 530 are for configuring the processor 510 to generate the certificates signed by the CA 110. The certificates may be, for example, an X.509v1, X.509v2, or X.509v3 certificate. The certificate can be signed by a CA signing key according to, for example, a certificate signature procedure such as MD2, MD5, SHA-1, SHA-256, or SHA-386 with RSA, SHA-1 with DSA, SHA-256 or SHA-386 with ECDSA. The certificate can include a public key for the client published in a public key file or imbedded in the certificate. The certificate generation instructions 530 are further for dynamically generating a digital certificate and associated public key for the recipient client after having received a request for digital certificate generation from the directory server 105 for a recipient client such as, for example, the fetch request 230 shown in FIGS. 2A and 3A. The certificate handling instructions 535 are for configuring the processor 510 to store the dynamically generated certificate in the directory of the directory server 105. That is, the dynamically generated digital certificate and public key are published in the directory.É

Further, the key generation instructions 540 are for generating a private key as well as the public key after having received the request for digital certificate generation from the directory server 105 for a recipient client. The public and private key can be generated according to, for example, the Rivest Shamir Adleman (RSA) based PKI, the elliptic curve cryptography (ECC) based PKI, or the digital signature algorithm (DSA).

The key storage instructions 545 are for configuring the processor 510 to store the dynamically generated private key in a secure memory to be accessed by the recipient client after performing a client authentication process. The key storage instructions 540 may be, for example, the data recovery manager 310 for storing the dynamically generated private key in the secure key repository 315 as the secure memory to be accessed by the recipient client 130 after the client authentication process is performed.

The authentication instructions 550 are for configuring the processor 510 to perform a client authentication process for authenticating the recipient client 130. The client authentication process can be, for example, a Kerberos authentication process. After successfully client authentication, the private key can be communicated to the recipient client 130.

Figure 6:
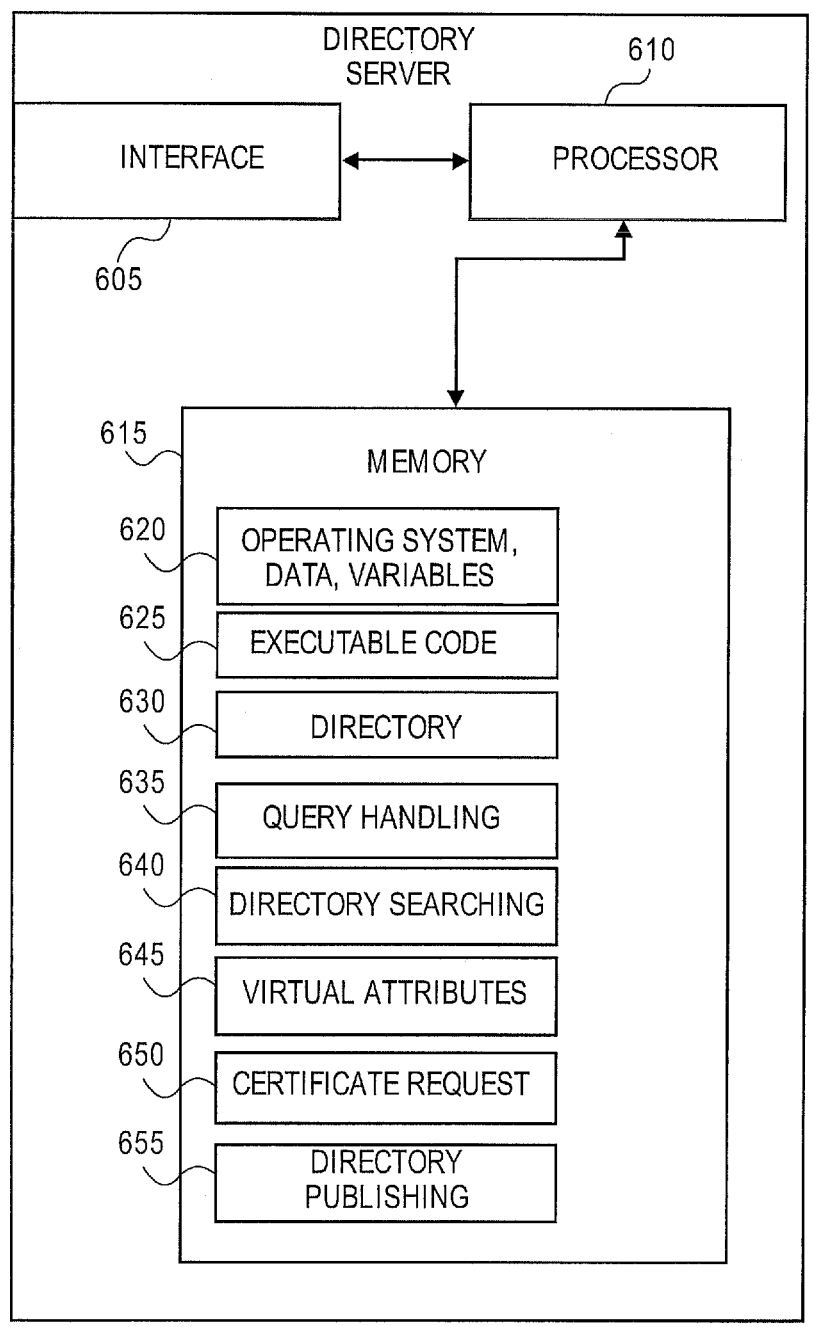
FIG. 6 is a block diagram illustrating portions of an exemplary directory server.

Referring to FIG. 6, the directory server 105 will be discussed. The directory server 105 includes an interface 605, a processor 610 and a memory 615. The interface 605 is generally for providing hardware as well as software connection with the CA 110 as well as other clients, such as the client sender 125 and the client recipient 130 via the network 120. The interface 605 may be a USB connector circuit and USB software driver. The processor 610 can be one of a variety of different processors including general purpose processors, custom processors, controllers, compact eight-bit processors or the like. The memory 615 can be one or a combination of a variety of types of memory such as RAM, ROM, flash memory, DRAM or the like. The memory 615 can include a basic operating system, data, and variables 620, executable code and other data 625. Further, the memory 615 can include computer programs or instructions for directing the processor 610 to control the operation of the directory server 105. The computer programs can include, for example, directory 630, query handling 635, directory searching 640, virtual attributes 645, certificate requests 650 and directory publishing 655. These are described in more detail below.

The directory instructions 630 are for establishing the directory of client attributes and virtual attributes. The query handling instructions 635 are for processing directory queries. The directory can be an X.500 based directory and the directory queries can be LDAP queries. However, the directory should be LDAP compliant and should be capable of receiving directory queries and sending replies over hypertext transfer protocol (HTTP) or HTTP secure connections. Further, in an alternative to the CA 110, the directory instructions 630 may further be for storing the dynamically generated private key in a secure memory to be accessed by the client determined after a client authentication process.

The directory searching instructions 640 are for providing an API for searching the tree like structure of the directory. The virtual attributes instructions 645 can be an executable script for, when receiving a directory query for an entry associated with the client that cannot be located in the directory, requesting the CA 110 to dynamically generate a certificate and associated public and private key for the client, and for storing the dynamically generated certificate and public key as a client attribute in the directory. The certificate requests instructions 650 are for generating the fetch requests to request the CA to dynamically generate a certificate. The directory publishing instructions 655 are for publishing the digital certificate dynamically generated by the CA 110 in the directory.

It will be appreciated that in some instances, the directory server 105 and the certificate authority 110 can exist within the same computer. In such a case, the connection 107 can be a data bus or high speed serial connection or the like. The directory server 105 and the certificate authority 110 can both have access to information stored locally, and also can access information stored remotely in various external data systems not shown provided a proper interface exists to the external data systems. It will be appreciated that the directory server 105 and the CA 110 may be a general purpose computer or dedicated computing platform configured to execute secure and/or unsecure or open applications through a multiple client operating system. The directory server 105 and the CA 110 may be implemented with general purpose server platforms as known to those skilled in the art from Intel, Advanced Micro Devices, Hewlett-Packard, and/or others or can be implemented with other custom configured server architectures.

Any of the above can be embodied on a computer readable medium, which includes storage devices and signals, in compressed or uncompressed form. Exemplary computer readable storage devices include conventional computer system random access memory (RAM), read-only memory (ROM), erasable programmable ROM (EPROM), electrically erasable programmable ROM (EEPROM), and magnetic or optical disks or tapes. Exemplary computer readable signals, whether modulated using a carrier or not, are signals that a computer system can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

It should also be understood that although various logical groupings of functional blocks were described above, different realizations may omit one or more of these logical groupings. Likewise, in various realizations, functional blocks may be grouped differently, combined, or augmented. Furthermore, one or more functional blocks including those identified herein as optional can be omitted from various realizations. For example, the present description may describe or suggest a collection of data and information. One or more embodiments can provide that the collection of data and information can be distributed, combined, or augmented, or provided locally and/or remotely.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
    determining, by a processor, that a directory does not include client attributes associated with a client recipient in the directory; and
    in response to determining that the directory does not include client attributes for the client recipient, accessing a client virtual attribute, wherein accessing the client virtual attribute causes the processor to perform operations comprising:
        receiving a new certificate associated with but not authorized by the client recipient from a certificate authority, wherein the new certificate is signed by the certificate authority and is associated with a public key and a private key;
        sending the new certificate and the public key to a client sender;
        storing the signed new certificate and associated public key as client attributes for the client recipient in the directory; and
        sending the private key to the client recipient.

2. The method of claim 1, further comprising storing the private key in a secure memory to be accessed by the client recipient after performing an authentication process.

3. The method of claim 1, further comprising storing the private key in a secure key repository associated with a data recovery manager to be accessed by the client recipient after performing an authentication process.

4. The method of claim 1, further comprising:
    receiving a query from the client sender for the digital certificate, wherein the directory comprises an X.500 based directory and the query comprises a Lightweight Directory Access Protocol (LDAP) query.

5. A non-transitory computer readable storage medium comprising computer executable instructions to cause a processor to perform operations comprising:
    determining, by the processor, that a directory does not include client attributes associated with a client recipient in the directory; and
    in response to determining that the directory does not include client attributes for the client recipient, accessing a client virtual attribute, wherein accessing the client virtual attribute causes the processor to perform operations comprising:
        receiving a new certificate associated with but not authorized by the client recipient from a certificate authority, wherein the new certificate is signed by the certificate authority and is associated with a public key and a private key;
        sending the new certificate and the public key to a client sender;
        storing the signed new certificate and associated public key as client attributes for the client recipient in the directory; and
        sending the private key to the client recipient.

6. The non-transitory computer readable storage medium of claim 5, wherein the operations further comprise:
    storing the private key in a secure memory to be accessed by the client recipient after performing an authentication process.

7. The non-transitory computer readable storage medium of claim 5, wherein the operations further comprise:
    receiving a query from the client sender for the certificate, wherein the directory is located within a directory server, wherein the directory server comprises an X.500 based directory, and wherein the query comprises a Lightweight Directory Access Protocol (LDAP) query.

8. A method comprising:
    accessing a client virtual attribute in response to a determination that a directory does not include client attributes associated with the client recipient, wherein accessing the client virtual attribute causes a processor to perform operations comprising:
        generating a certificate, a public key, and a private key for the client recipient, wherein the public key and the private key are associated with the certificate;
        signing the certificate;

providing the certificate and the public key to a client sender;

storing the signed certificate and associated public key as client attributes for the client recipient in the directory; and sending the private key to the client recipient after performing a client authentication process.

9. The method of claim 8, wherein the client authentication process comprises a Kerberos authentication process.

10. The method of claim 8, further comprising:

publishing the certificate and the public key in a directory server, the directory server comprising an X.500 based directory, the publishing of the certificate and the public key performed according to a Lightweight Directory Access Protocol (LDAP).

11. The method of claim 8, further comprising storing the generated private key in a secure key repository using a data recovery manager.

12. The method of claim 8, wherein the request to generate the certificate is received based on a query for an existing certificate of the client recipient in a directory server, wherein the directory server fails to locate the existing certificate for the client recipient.

13. A server comprising:

a memory to store a directory; and a processor coupled to the memory, the processor to:

determine that the directory does not include client attributes associated with a client recipient and, in response to determining that the directory does not include client attributes for the client recipient, accessing a client virtual attribute, wherein accessing the client virtual attribute causes the processor to:

receive a new digital certificate associated with but not authorized by the client recipient from a certificate authority, wherein the new certificate is signed by the certificate authority and is associated with a public key and a private key;

provide a copy of the public key to a client sender;

store the signed new certificate and associated public key as client attributes for the client recipient in the directory; and provide the private key to the client recipient.

14. The server of claim 13, the processor to store the private key in a secure portion of the memory to be accessed by the client recipient after performing a client authentication process.

15. The server of claim 13, the processor to store the private key in a secure portion of the memory to be accessed by the client recipient after a client authentication process, the client authentication process comprising a Kerberos authentication process.

16. A system comprising:

a memory to store a directory; and a processor coupled to the memory, the processor to:

generate digital certificates and public keys for client recipients, the processor storing the digital certificates and the public keys in the directory as client attributes, determine that the directory does not include client attributes for a client recipient, in response to determining that the directory does not include client attributes for the client recipient, accessing the client virtual attribute, wherein accessing the client virtual attribute causes the processor to perform operations comprising:

generating a digital certificate, an associated public key, and an associated private key for the client recipient;

digitally signing the generated digital certificate;

storing the digitally signed generated digital certificate and the associated public key as client attributes for the client recipient in the directory; and providing the associated public key to a client sender.

17. The system of claim 16, wherein the client virtual attribute comprises an executable script for causing the directory to fetch the digitally signed generated digital certificate and the associated public key.

18. The system of claim 16, the processor to store the generated private key in a secure portion of the storage device to be accessed by the client recipient after performing a client authentication process.

19. The system of claim 16, the processor to store the generated private key in a secure portion of the storage device to be accessed by the client recipient after a client authentication process, the client authentication process comprising Kerberos authentication process.

20. The system of claim 16, wherein the directory stores the generated private key in a secure portion of the storage device to be accessed by the client recipient after a client authentication process.

21. The system of claim 16, the processor to store the generated private key in a secure key repository to be accessed by the client recipient after performing a client authentication process.

22. The system of claim 16, wherein the directory comprises an X.500 directory model, the directory to receive directory queries for digital certificates associated with clients according to a Lightweight Directory Access Protocol (LDAP).

* * * * *